United States Patent [19]

Blum et al.

[11] Patent Number: 5,405,655
[45] Date of Patent: Apr. 11, 1995

[54] TEMPERATURE-RESISTANT AND/OR NONWETTING COATINGS OF CURED, SILICON-CONTAINING POLYMERS

[75] Inventors: Yigal D. Blum, San Jose; Gregory A. McDermott, San Francisco, both of Calif.

[73] Assignee: SRI International, Menlo Park, Calif.

[21] Appl. No.: 978,098

[22] Filed: Nov. 19, 1992

[51] Int. Cl.$^6$ ............................................. B05D 3/02
[52] U.S. Cl. ...................................... 427/387; 528/10; 528/28; 528/31; 528/38
[58] Field of Search ..................... 528/10, 28, 31, 38; 427/387

[56] References Cited

U.S. PATENT DOCUMENTS

| | | | |
|---|---|---|---|
| 3,311,571 | 3/1967 | Burks, Jr. et al. | 260/2 |
| 3,944,587 | 3/1976 | Katsushima et al. | 260/448.8 R |
| 3,979,546 | 9/1976 | Lewis et al. | 427/387 |
| 4,255,549 | 3/1981 | Christophliemk et al. | 427/387 |
| 4,301,197 | 11/1981 | Franz et al. | 427/353 |
| 4,591,652 | 5/1986 | Depasquale et al. | 556/419 |
| 4,678,688 | 7/1987 | Itoh et al. | 427/387 |
| 4,855,348 | 8/1989 | Strader | 427/387 |
| 4,952,715 | 8/1990 | Blum et al. | 556/409 |
| 4,954,539 | 9/1990 | Cavezzan et al. | 524/27 |
| 4,983,459 | 1/1991 | Franz et al. | 428/410 |
| 4,997,684 | 3/1991 | Franz et al. | 427/384 |
| 5,136,007 | 8/1992 | Myers | 528/21 |
| 5,256,487 | 10/1993 | Myers | 528/21 |

FOREIGN PATENT DOCUMENTS

| | | |
|---|---|---|
| 228148 | 4/1986 | European Pat. Off. |
| 489428A1 | 12/1991 | European Pat. Off. |
| 498666A2 | 1/1992 | European Pat. Off. |
| WO86/06377 | 3/1986 | WIPO |

OTHER PUBLICATIONS

R. E. Burks, Jr., et al. Copolymers and elastomers with alternating dioxysilphenylene and silnae units, *J. Poly. Sci.* 11:319–326 (1973).

P. Dvornic et al., Exactly alternating silarylene-siloxane polymers: 6. Thermal stability and degradation behaviour, *Polymer* 24:763–767 (1983).

P. Hergenrother, Perspectives in the development of high-temperature polymers, *Angew. Chem. Int. Ed. Engl.* 29:1262–1268 (1990).

C. U. Pittman, Jr., et al., Oxysilnae polymers from silanediol–bisdimethylaminosilane polycondensations: Synthesis and properties, *J. Poly. Sci.* 14:1715–1734 (1976).

*Primary Examiner*—Shrive Beck
*Assistant Examiner*—Erma Cameron
*Attorney, Agent, or Firm*—Dianne E. Reed

[57] ABSTRACT

Surfaces of various types of substrates, including glass, ceramics, metals and fabrics, are rendered thermally stable by treatment with a silicon-containing polymer which may be a polysilazane, a polysiloxane, or a polysiloxazane. Curing the polymer in an atmosphere which contains an oxygen donor additionally renders the substrate surface nonwetting.

47 Claims, 4 Drawing Sheets

TEMPERATURE-RESISTANT AND/OR NONWETTING COATINGS OF CURED, SILICON-CONTAINING POLYMERS

TECHNICAL FIELD

This invention relates generally to coatings of silicon-containing polymers, and more particularly relates to coatings of selected polysilazanes, polyhydridosiloxanes, and polysiloxazanes prepared at temperatures below about 300° C. The coatings are thermally stable, and, in the case of metal substrates, are corrosion-resistant as well. In some cases, the coatings may also be nonwetting. The invention additionally encompasses methods of preparing coated substrates having the aforementioned properties.

BACKGROUND

The present invention is directed to protective coatings which may be provided on a wide variety of substrate types, and which are both stable at high temperatures and, in the case of metal substrates, corrosion-resistant. Although a number of materials and procedures for making coatings are known in the art, there remains a need for coatings which are chemically and physically stable to heat and do not corrode over time. Further, many prior art techniques involve very long curing times and/or very high curing temperatures, limiting ease of manufacturability. Frequently, there are trade-offs between the various desired characteristics of flexibility, hardness, and coating adhesion. In addition, most coatings which have one or more of the aforementioned advantages do not provide "release surfaces," i.e. they are not fluid-resistant.

Some organometallic and inorganic polymers are known for their thermal stability. Certain polysiloxanes, for example, have been the most widely commercialized of these polymers, but there has been nothing to suggest that such polymers would be useful to make high temperature coatings, with the exception of a few polymers that were found to be costly to manufacture and were thus never commercialized. Since polysiloxanes have typically been used as high temperature oils and elastomers, very little research has been conducted to modify these compounds to provide hard, relatively thick coatings.

Polyphosphazenes belong to another category of inorganic polymers with potential stability at temperatures of 400° C. or higher. Again, there has not been any suggestion that such polymers could be used as high temperature protective coatings; most research efforts have concentrated on the elastomeric, electrical or optical properties of the polymers.

Still another family of polymers which have been used to provide oxidation-resistant and corrosion-resistant coatings are fluorocarbons such as tetrafluoroethylene, commercially available as Teflon ®. Information concerning tetrafluoroethylene polymers may be found, inter alia, in U.S. Pat. No. 2,230,654 to Plunkett, issued 4 Feb. 1941. Tetrafluoroethylene coatings, however, like coatings prepared from other poly(fluorocarbons), have limited stability at temperatures above about 300° C.

A different approach for protecting metal surfaces against corrosion at high temperatures and in harsh environments is by the application of ceramic coatings. Ceramic coatings can be fabricated at the surface of metals as uniform, hermetically sealed layers that are well-bonded to the substrate. This approach provides another method of protecting metals against chemical attack. However, only thin films can be formed by single-layer deposition without cracking. Additionally, the equipment which has typically been necessary to prepare ceramic coatings is costly, can only process substrates of a limited size, and requires deposition times which are often long.

Preceramic polymers that can be fabricated like organic polymers and then cured and pyrolyzed to give ceramic products are being developed as an alternative for processing advanced ceramics. Thin ceramic coatings can be made by simple wet techniques using solutions of organometallic precursors. The developed coatings are hard, very stable at high temperatures, and provide protection against corrosion. However, these coatings lack flexibility because their extensive cross-linking network results in a high modulus of elasticity. Thick layers (on the order of 4 $\mu$m or greater, more typically in the range of about 10 $\mu$m to 50 $\mu$m) cannot be obtained by a single deposition operation using preceramic polymers because the coatings tend to crack as a result of the drastic shrinkage that occurs during conversion of the polymer to a ceramic network and, further, because of a mismatch in the expansion coefficient between the coating and substrate. It is possible to limit shrinkage to one dimension, vertical to the surface, only when fabricating relatively thin layers (less than 4 $\mu$m).

It has now been discovered that selected silicon-containing polymers can be used to prepare coatings which overcome the disadvantages of the prior art and meet all of the above-mentioned criteria, i.e., the coatings provided by the method described and claimed herein are heat-stable, rapidly cured at relatively low temperatures, display excellent hardness and adhesion, can remain intact even when the substrate is deformed, and do not corrode over time. Additionally, the coatings may be prepared under conditions which render them nonwetting.

The following references relate generally to polymeric coatings which are thermally stable and/or nonwetting, and to polymers which can be used to prepare such coatings.

U.S. Pat. No. 3,944,587 to Katsushima et al. describes certain hydroxypolyfluoroalkyl-containing silane derivatives as water- and oil-repellent agents. The reference states that a variety of material types may be rendered water- and oil-repellent by applying coatings of the disclosed silane derivatives. The silane compounds react with the substrate surface to provide the water- and oil-repellent coatings.

U.S. Pat. No. 3,979,546 to Lewis describes a method for rendering inorganic substrates hydrophobic which involves treating the substrate surface with alkoxy-omega-siloxanols. The siloxanols are prepared by reacting selected cyclic siloxanes with alcohols.

U.S. Pat. No. 4,301,197 to Franz et al. describes the use of selected poly(alkyl hydrogen siloxanes) to treat glass surfaces to improve the release of polymeric materials.

U.S. Pat. No. 4,591,652 to DePasquale et al. describes certain polyhydroxyl silanes or siloxanes as useful in preparing coatings on metal or glass. The coatings are prepared by curing at temperatures in the range of 90° C. to 150° C.

U.S. Pat. No. 4,954,539 to Cavezzan et al. describes thin films of an aqueous silicone emulsion crosslinked by a monochelate of pentacoordinated tin and cured at temperatures in the range of 80° to 220° C. The films are stated to be water-repellent and/or nonadhesive.

U.S. Pat. Nos. 4,983,459 and 4,997,684 to Franz et al. describes treatment of a glass surface with a combination of a perfluoroalkyl alkyl silane and a fluorinated olefin telomer to provide a nonreactive, nonwetting surface.

P. Hergenrother, *Angew. Chem. Int. Ed. Engl.* 29:1262–1268 (1990), generally relates to thermally stable polymers—including polyimides, poly(aryl ethers) and imide/aryl ether copolymers—and their potential uses.

Silicon-containing polymers are described as potentially useful materials in environments which require thermal stability and oxidation-resistance by R. E. Burks, Jr., et al., *J. Poly. Sci.* 11:319–326 (1973), C. U. Pittman, Jr., et al., *J. Poly. Sci.* 14:1715–1734 (1976), and P. Dvornic et al., *polymer* 24:763–767 (1983).

SUMMARY OF THE INVENTION

A primary object of the invention is to address the above-mentioned needs in the art by providing coatings of silicon-containing polymers which are thermally stable and, in the case of metal substrates, corrosion-resistant.

Another object of the invention is to provide such a coating which is also nonwetting.

Still another object of the invention is to provide such a coating of a silazane, siloxane or siloxazane polymer.

Yet another object of the invention is to provide such a coating on a metallic, glass, ceramic or fabric substrate.

A further object of the invention is to provide methods for making the aforementioned coatings.

Additional objects, advantages and novel features of the invention will be set forth in part in the description which follows, and in part will become apparent to those skilled in the art upon examination of the following, or may be learned by practice of the invention.

In one aspect, the invention involves a method for providing a thermally stable, nonpyrolyzed coating on a substrate, in which a solution of a curable silicon-containing polymer—a polysilazane, a polysiloxane, a polysiloxazane, or a mixture thereof—is cast onto the selected substrate and cured thereon in a selected curing atmosphere, e.g., air, an inert gas, nitrogen, ammonia or the like.

In another aspect, coated substrates are provided by the aforementioned process. The coated substrate surface is, as noted above, thermally stable, corrosion-resistant and, depending on the curing conditions, nonwetting as well.

DETAILED DESCRIPTION OF THE INVENTION

Definitions and Nomenclature

Before the present methods, polymers and coatings are disclosed and described, it is to be understood that this invention is not limited to specific polymers or coating conditions, as such may, of course, vary. It is also to be understood that the terminology used herein is for the purpose of describing particular embodiments only and is not intended to be limiting.

It must be noted that, as used in the specification and the appended claims, the singular forms "a," "an" and "the" include plural referents unless the context clearly dictates otherwise. Thus, for example, reference to "a silicon-containing polymer" includes mixtures of such polymers, reference to "a coating" includes multiple layers of coatings, and the like.

In this specification and in the claims which follow, reference will be made to a number of terms which shall be defined to have the following meanings:

The term "thermally stable" as used herein refers to a coating which is chemically and physically stable at temperatures up to about 500° C. i.e. a coating which neither decomposes to an inorganic ceramic material nor volatilizes to the gaseous state at temperatures below about 500° C.

The term "pyrolysis" as used herein refers to the conversion of an organic material or an organometallic material to an inorganic material. Generally, the coatings of the invention are not prepared pyrolitically, although they may in some cases be prepared in such a way as to undergo partial, low temperature (<300° C.) pyrolysis.

The term "corrosion resistant" as used herein refers to a coating on a metal substrate which does not corrode when exposed to air, heat, or corrosive environments for prolonged time periods.

The term "nonwetting" as used herein refers to a substrate surface which has a very low compatibility with liquids.

The term "alkyl" as used herein refers to a branched, unbranched or cyclic saturated hydrocarbon group of 1 to 26 carbon atoms, such as methyl, ethyl, n-propyl, isopropyl, n-butyl, isobutyl, t-butyl, octyl, decyl, tetradecyl, hexadecyl, eicosyl, tetracosyl and the like. Preferred alkyl groups herein contain 1 to 10, more typically 1 to 8, carbon atoms. The term "lower alkyl" intends an alkyl group of one to six carbon atoms, preferably one to four carbon atoms. The alkyl groups present on the polymers described herein may be unsubstituted or they may be substituted with one or more functional groups, e.g., amine, hydroxyl, an olefinic group such as a vinyl or an allyl group, or the like.

The term "hydrocarbyl" as used herein refers to a branched, unbranched or cyclic hydrocarbon group of 1 to 26 carbon atoms, typically of 1 to 8 carbon atoms. "Hydrocarbyl" groups include, inter alia, alkyl, alkenyl, alkylene and aryl groups.

The term "olefinic group" intends a mono-unsaturated or di-unsaturated hydrocarbon group of 2 to 12 carbon atoms. Preferred olefinic groups within this class are sometimes herein designated as "lower olefinic groups," intending a hydrocarbon moiety of 2 to 6 carbon atoms containing a single terminal double bond. The latter moieties may also be termed "lower alkenyl."

The term "alkylene" as used herein refers to a difunctional saturated branched or unbranched hydrocarbon chain containing from 1 to 26 carbon atoms. "Lower alkylene" refers to alkylene linkages containing from 1 to 6 carbon atoms, and includes, for example, methylene (—CH$_2$—), ethylene (—CH$_2$CH$_2$—), propylene (—CH$_2$CH$_2$CH$_2$—), 2-methylpropylene (—CH$_2$—CH(CH$_3$)—CH$_2$—), hexylene (—(CH$_2$)$_6$—) and the like.

The term "alkoxy" refers to an alkyl group as defined above bound through an ether linkage, typically to a silicon atom. "Lower alkoxy" intends an alkoxy group containing one to six, more preferably one to four, carbon atoms.

The term "aryl" as used herein refers to an aromatic species having 1 to 3 rings, but typically intends a monocyclic or bicyclic moiety, e.g., phenyl or 1- or 2-naphthyl groups. Optionally, these groups are substituted with one to four, more preferably one to two, lower alkyl, lower alkoxy, hydroxy, amino, and/or nitro substituents.

The term "amino" intends an amino group —NH$_2$. where R is hydrogen or an alternative substituent, typically lower alkyl. The term "amino" is thus intended to include primary amino —NH$_2$, "alkylamino" (i.e., a secondary amino group containing a single alkyl substituent), and "dialkylamino" (i.e., a tertiary amino group containing two alkyl substituents).

"Halo" or "halogen" refers to fluoro, chloro, bromo or iodo, and usually relates to halo substitution for a hydrogen atom in an organic compound. Of the halos, chloro and fluoro are generally preferred.

"Silazanes" as used herein are compounds which contain one or more silicon-nitrogen bonds and may or may not contain cyclic units. The terms "polysilazane" and "silazane polymer" are intended to include oligomeric and polymeric silazanes, i.e., compounds which include two or more monomeric silazane units.

"Siloxanes" as used herein are compounds which contain one or more silicon-oxygen bonds and may or may not contain cyclic units. The terms "polysiloxane" and "siloxane polymer" as used herein are intended to include oligomeric and polymeric siloxanes, i.e., compounds which include two or more monomeric siloxane units.

"Siloxazanes" as used herein are compounds which contain both [Si—O] and [Si—N] units and may or may not contain cyclic units. The term "polysiloxazane" is intended to include oligomeric and polymeric siloxazanes.

"Silyl," unless otherwise specified, includes siloxyl, siloxazyl, and silazyl, and furthermore includes repeating silyl units, or "polysilyl" species.

"Optional" or "optionally" means that the subsequently described event or circumstance may or may not occur, and that the description includes instances where said event or circumstance occurs and instances where it does not. For example, the phrase "optionally substituted alkyl group" means that the alkyl group may or may not be substituted and that the description includes both unsubstituted alkyl and alkyl where there is substitution. Similarly, a process which is "optionally" carried out in the present of a particular chemical agent means that such an agent may or may not be present.

The Polymers

The polymers used in the preparation of the presently disclosed and claimed coatings are silicon-containing polymers which are preferably formed by a dehydrocoupling reaction, e.g., as described in commonly assigned U.S. Pat. No. 4,788,309, the disclosure of which is hereby incorporated by reference. The polymers should not be extensively crosslinked, i.e., it is preferable that fewer than about 50% of the structural units be crosslinked.

Particularly preferred polymers for use in conjunction with the present invention are those which are described in detail in applicants' commonly assigned U.S. Patents, as follows: U.S. Pat. No. 4,952,715 to Blum et al., issued 28 Aug. 1990 ("Polysilazanes and Related Compositions, Processes and Uses"), U.S. Pat. No. 5,008,422 to Blum et al., issued 16 Apr. 1991 (also entitled "Polysilazanes and Related Compositions, Processes and Uses"), and U.S. Pat. No. 5,128,494 to Blum, issued 7 Jul. 1992 ("Hydridosiloxanes as Precursors to Ceramic Products"). The disclosures of each of these patents are hereby incorporated by reference in their entireties, and reference may be had to these documents for information not explicitly set forth herein.

In a first embodiment, the polymer which is used to prepare the coatings of the invention is a silicon-containing polymer containing recurring units having the structural formula (I)

In Formula (I), the various substituents are defined as follows.

R$^1$ and R$^2$ are independently selected from the group consisting of:
 (i) hydrogen;
 (ii) hydroxyl;
 (iii) C$_1$–C$_{10}$ alkyl, either unsubstituted or substituted with hydroxyl, lower alkyl, lower alkenyl, lower alkoxy halogen silyl or NR$^3{}_2$ groups where R$^3$ is hydrogen, lower alkyl, or lower alkenyl;
 (iv) C$_1$–C$_{10}$ alkenyl, either unsubstituted or substituted as in (iii);
 (v) C$_1$–C$_{10}$ alkoxy, either unsubstituted or substituted as in (iii);
 (vi) aryl of 1-2 rings, either unsubstituted or substituted as in (iii);
 (vii) NR$^3{}_2$; and
 (viii) silyl.

Alternatively, one or both of R$^1$ and R$^2$ may be an —O—, —NR$^{3a}$—or alkylene, preferably lower alkylene, crosslink to another unit of structural formula (I), wherein R$^{3a}$ is hydrogen, lower alkyl, lower alkenyl, or aryl of 1-2 rings, either unsubstituted or substituted as in (iii).

X$^1$ and X$^2$ are independently either O or NR$^4$ where R$^4$ is selected from the group consisting of hydrogen, amino, silyl, unsubstituted C$_1$–C$_8$ hydrocarbyl, C$_1$–C$_8$ hydrocarbyl substituted as in (iii), and aryl of 1-2 rings, either unsubstituted or substituted as in (iii).

The subscript "x" is an integer greater than or equal to 0, and "y" is an integer greater than or equal to 1, with the proviso that the sum of x and y is at least 2.

The subscript "n" is 0, 1 or 2, with the proviso that if both X$^1$ and X$^2$ are O, n is other than 2.

Examples of such polymers include polysilazanes comprising recurring units having the structural formula (II)

(II)

wherein m is an integer defining the number. Other examples of polymers falling within the generic grouping of structural formula (I) are those represented by structural formula (III)

(III)

in which l and n, as above, are integers defining the number of monomer units in the polymer.

Still other examples of polymers encompassed by structural formula (I) are polyhydridosiloxanes containing recurring mer units of the structure (IV)

Figure 4:
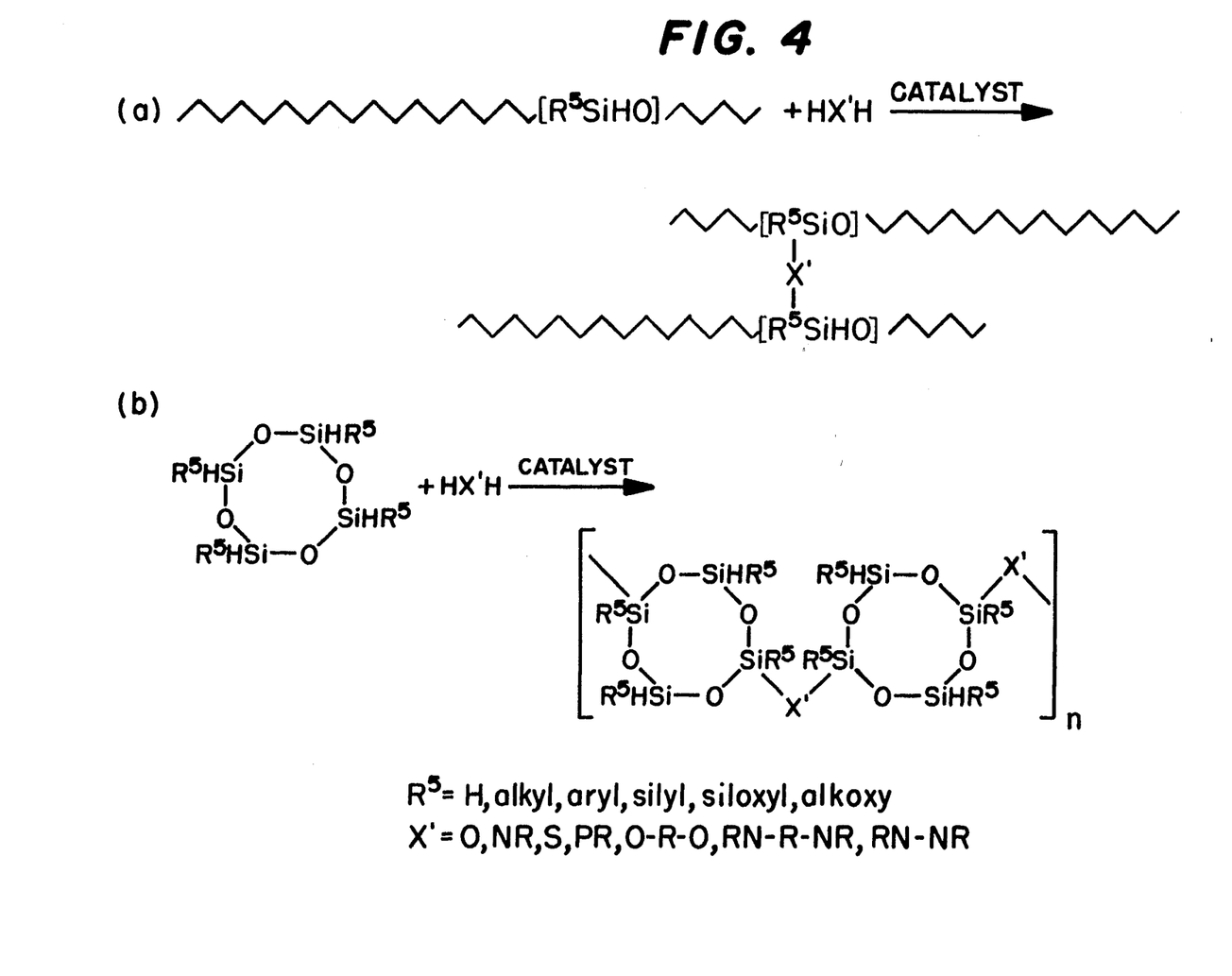
FIG. 4 schematically illustrates the synthesis of a polyhydridosiloxane.

(IV)

wherein n' is 0 or 1 and z is an integer defining the length of the polymer, and hydridosiloxanes containing cyclomeric units, e.g., as illustrated in FIG. 4.

Other polymers which may be used in conjunction with the present method are curable polysilazanes containing recurring units of the structures (V) or (VI) or both (V)

(VI)

In these formulae, the substituents are defined as follows.

The letter "k" represents 0 or an integer.

The $R^5$ substituents may be the same or different and are selected from the group consisting of hydrogen, hydroxyl, lower alkyl, lower alkenyl, lower alkoxy, silyl, aryl, and amino, unsubstituted or substituted with 1 or 2 lower alkyl groups.

X is —$NR^7$— or —$NR^7$—Y—$NR^7$— where Y is an optional linking group which, if present, is lower alkyl, lower alkenyl or silyl.

The $R^6$ and $R^7$ may be the same or different and are selected from the group consisting of hydrogen, lower alkyl, lower alkenyl, silyl and aryl.

Analogous cyclomer-containing hydridosiloxanes have the structural formula wherein $R^5$ is as defined above, and X' is O, $NR^7$ or $NR^7$—Y—$NR^7$.

Method for Preparing Coatings

Coated substrates according to the invention are prepared by dissolving the selected polymer or polymers in a compatible organic solvent, if necessary, to prepare a coating solution. It should be noted that some polymers which exist as liquids may be used to prepare coatings without need for a solvent.

Preferred solvents for preparing the coating solution are such that they do not react with the polymer (e.g., alcohols should be avoided when preparing coatings of polysilazanes), and are sufficiently volatile to facilitate drying of the coating. Also, clearly, it is desirable to avoid use of hazardous solvents such as benzene, trichloroethylene or the like. Examples of particularly preferred solvents include toluene, tetrahydrofuran and hexane. The coating solution will generally be formulated to contain on the order of 0.1 wt. % to 99 wt. % polymer, more preferably 0.1 wt. % to 20 wt. % polymer, and most preferably 0.1 wt. % to 10 wt. % polymer. Additional components which may be present in the coating solution include catalysts capable of activating Si—H, N—H and/or O—H bonds, and crosslinking agents.

It may also be desirable to incorporate organic or inorganic powders into the coating solution. This may be done for a number of reasons, the most obvious of which is to increase the viscosity of the coating solution to enable preparation of a paste or of a relatively thick solution which may be "painted" onto a substrate. For example, metal powders, such as copper, iron, zirconium, titanium, tungsten, molybdenum and aluminum powders may be admixed with the polymeric solution prior to coating. Such a technique is useful, for example, to provide an anti-corrosion barrier on the surface of a metallic substrate. Incorporation of metal powder into the coating solution is also useful to prepare a harder coating, regardless of substrate (in which case preferred metal powders include zirconium, titanium, tungsten, molybdenum and halfnium powders). It may also be desired to incorporate ceramic powders and glasses such as silicon carbide, silicon nitride, boron carbide, titanium carbide, titanium nitride, tungsten carbide, molybdenum oxide, and aluminum oxide, typically for the purpose of creating a harder coating, but also useful for providing a nonconductive surface on a conductive substrate, for providing corrosion-resistant coatings, impact-resistant coatings, and coatings having a mismatched thermal expansion coefficient, i.e., relative to the substrate surface. Inclusion of silica, boron nitride, aluminum nitride or beryllium oxide powders in the coating Solution is desirable in electronics application, insofar as these materials are good dielectrics. Carbon powder (including pyrolytic carbon powder and graphite powder) and organic powders such as teflon, siloxane (cured), polycarbonate, or polyamide powders may also be used to thicken the coating solution.

A wide variety of substrates may be coated using the present polymers and methods, including metals, ceramics, glass and organic materials such as polyesters, nylon and acrylates (this latter group may include fabrics). Examples of metal substrates include steel, aluminum, copper and the like, while examples of ceramics include silicon nitride, silicon carbide, silica, alumina, zirconia and the like. It will be appreciated by those skilled in the art that the foregoing lists are merely illustrative of various materials which may be coated using the presently disclosed techniques, and are not in any way limiting of the different substrates with which the present invention is useful.

The present method is also useful in coating substrates having different shapes, e.g., substrates having flat surfaces, molded articles having curved surfaces, fibers, and the like.

Coating may be effected by dipping the substrate to be coated in the aforementioned coating solution. Alternatively, the coating solution may be applied to the substrate by painting, spraying or spin-coating techniques. These procedures will typically provide coatings having a thickness of up to about 50 $\mu$m per coating layer for the cured polymers, but may provide coatings on the order of 1 $\mu$m, or even thinner, if desired. If a thicker coating is desired, multiple coating layers may be provided. The layers may be comprised of the same or different polymeric materials.

Depending on the polymer used, the coating is cured at a curing temperature ranging from room temperature to about 300° C. It is typically preferred that the curing temperature not exceed about 450° C., particularly for preparation of nonwetting coatings.

The polymeric coating is cured in a curing atmosphere which will promote crosslinking of the polymer. The curing atmosphere may be either inert or reactive. Inert curing atmospheres include the inert gases, e.g., argon, and also include nitrogen. Reactive curing atmospheres include air, ammonia, hydrogen, carbon monoxide, carbon dioxide and the like. Curing may also be effected in an atmosphere which combines two or more of the foregoing, and/or which contains an olefinic component or acetylene to promote crosslinking and increase the organic content of the coating.

The coatings so provided may be used in a wide variety of contexts, insofar as they protect virtually any type of substrate from oxidative thermal degradation, corrosion, or chemical attack. The coatings may also be used to strengthen relatively weak substrates such as glass and, as noted earlier herein, are useful for providing a nonwetting surface. The coatings may additionally be useful to provide electrical insulation and/or bonding or compatibility interfaces between different types of materials. If it is desired that the coating be nonwetting—i.e., in addition to being thermally stable and, in the case of metal substrates, corrosion-resistant—the coating should be cured in an atmosphere that contains an oxygen donor, e.g., oxygen or water.

It may also be desirable to cure the coating in an atmosphere containing a nitrogen donor such as ammonia or an amine, such that a dehydrocoupling reaction is caused to occur between the silicon-hydrogen bonds in the polymer and one or more nitrogen-hydrogen bonds in the nitrogen donor.

The following examples are put forth so as to provide those of ordinary skill in the art with a complete disclosure and description of how to carry out the methods of the invention and make the thermally stable, corrosion-resistant coatings claimed herein, and are not intended to limit the scope of what the inventor regards as his invention. Efforts have been made to ensure accuracy with respect to numbers (e.g., amounts, temperature, etc.) but some errors and deviations should be accounted for. Unless indicated otherwise, parts are parts by weight, temperature is in °C. and pressure is at or near atmospheric.

EXAMPLES 1–34

A. Synthesis of Polymers

Figure 1:
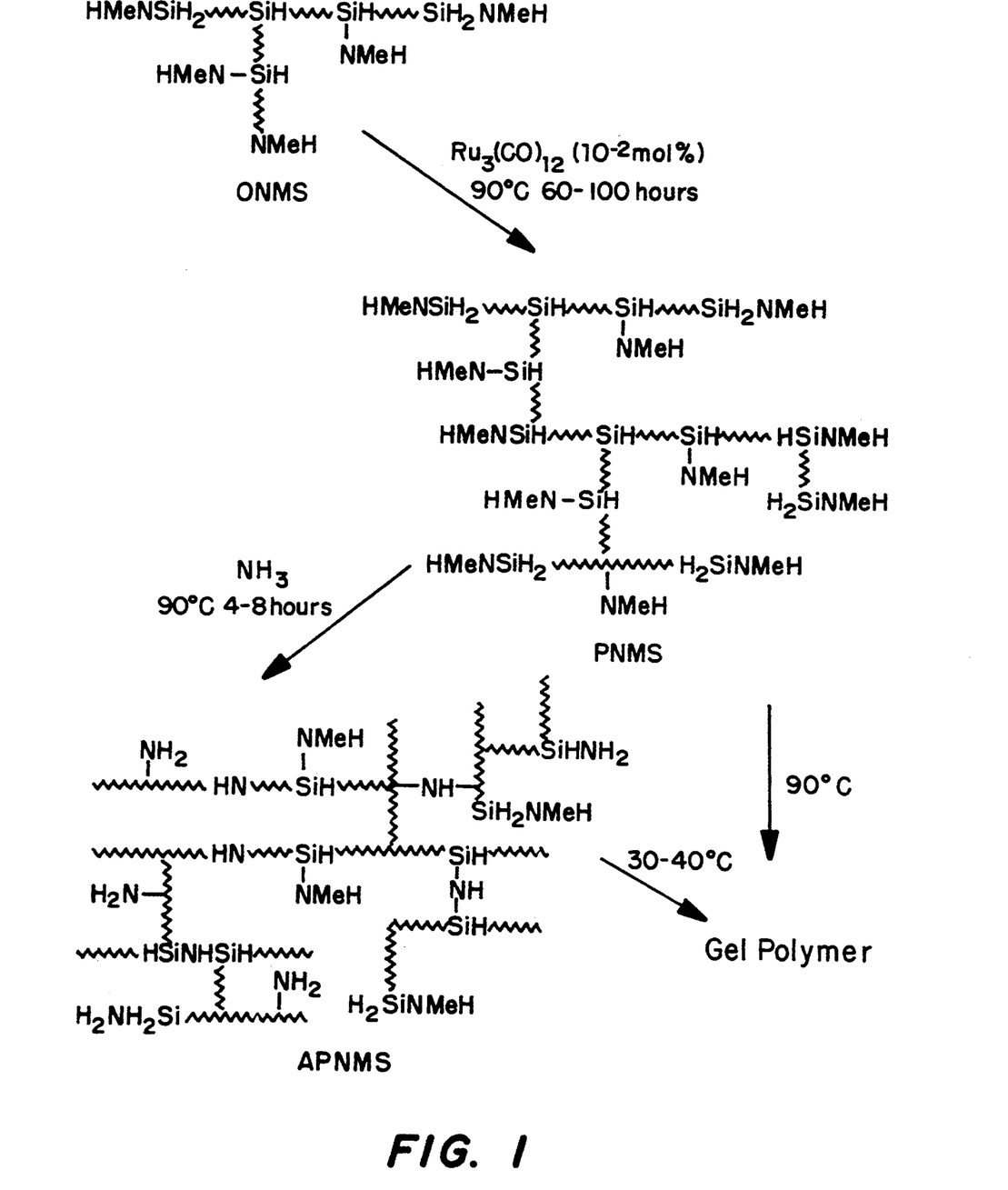
FIG. 1 schematically illustrates the synthesis of poly-N-methylsilazane and aminated poly-N-methylsilazane.

1. Preparation of Poly-N-Methylsilazane (PNMS):

To 50 g N-methylsilazane $[H_2SiNCH_3]_{x\sim17}$ was added 100 mg $Ru_3(CO)_{13}$. The mixture was heated at 90° C. for 60 hours to give a viscous polymer of 400–4500 poise with $M_n$ of 2400. The full synthetic procedure used (schematically illustrated in FIG. 1) was that described by R. E. Singler et al., in *Inorganic and Organometallic Polymers*, Eds. M. Zaldin et al., ACS Symposium Series 360:124 (1988), the disclosure of which is hereby incorporated by reference.

2. Preparation of Aminated Poly-N-Methylsilazane (APNMS):

Poly-N-Methylsilazane, as synthesized in the preceding section, was dissolved in toluene (~1 part polymer to 2 parts solvent). The solution was treated with $NH_3$ and heated to 90° C. for 4 hours to form a very viscous liquid that gelled rapidly in the absence of solvent. The full synthetic procedure used (also illustrated in FIG. 1) was that described by Y. D. Blum et al. in U.S. Pat. No. 5,008,422, the disclosure of which was incorporated by reference earlier herein.

Figure 2:
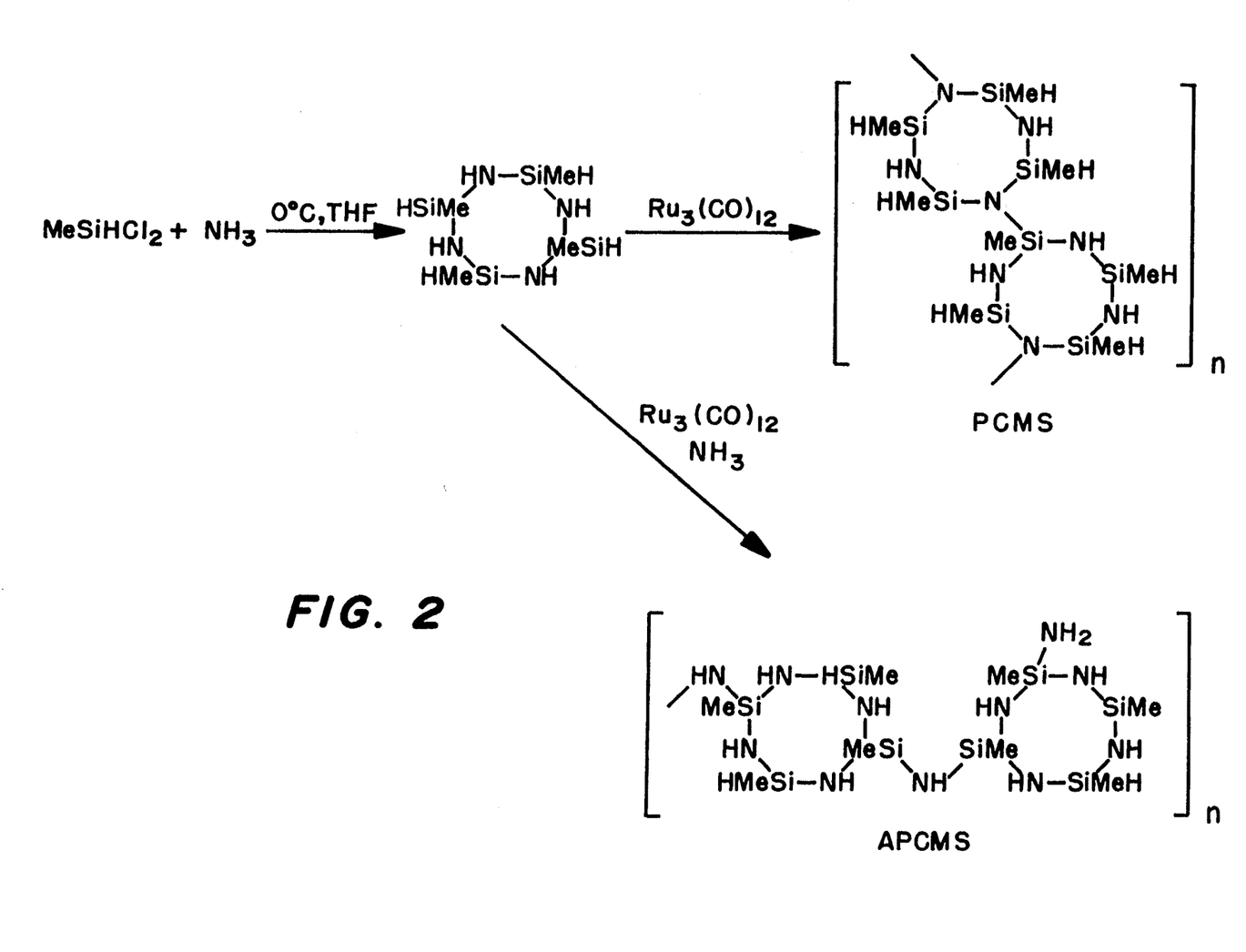
FIG. 2 schematically illustrates the synthesis of polycyclomethylsilazane and aminated polycyclomethylsilazane.
Figure 3:
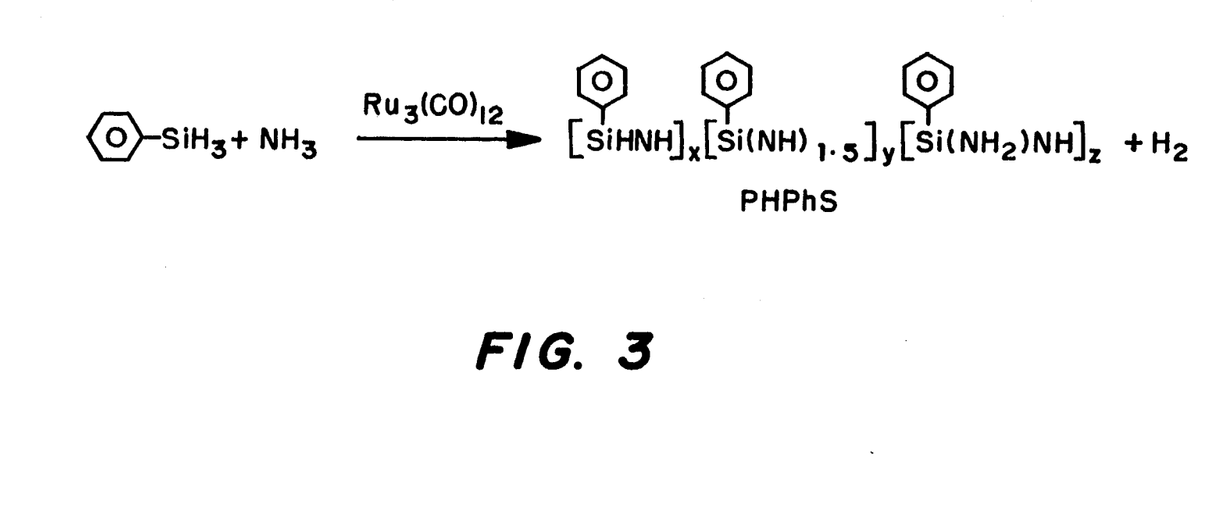
FIG. 3 schematically illustrates the synthesis of polyhydridophenylsilazane.

3. Preparation of Polycyclomethylsilazane (PCMS):

To 100 g $[HMeSiNH]_4$ (cyclomethylsilazane, CMS, prepared from $CH_3SiHCl_2$ and ammonia using conventional synthetic methods) was added 50 mg $Ru_3(CO)_{12}$. The mixture was heated at 90° C. for 200 hours, during which time there was evolution of $H_2$ and the viscosity increased to give a very viscous liquid. The full synthetic procedure used (illustrated in FIG. 2) was that described by Y. D. Blum et al., in *Better Ceramics Through Chemistry III*, Eds. C. J. Brinker et al., *Mater. Res. Soc. Symp. Proc.* 121:483 (1988), the disclosure of which is hereby incorporated by reference.

4. Preparation of Aminated Polycyclomethylsilazane (APCMS):

Cyclomethylsilazane was dissolved in tetrahydrofuran and then reacted with $NH_3$ (~20 mol % for silazane units) for 8 hours. Removal of the solvent gave a low melting solid that cured rapidly in the melt. The full synthetic procedure used (also illustrated in FIG. 2) was that described by Y. D. Blum et al., in *Better Ceramics Through Chemistry III*, cited and incorporated by reference in the preceding section.

5. Preparation of Polyhydridophenylsilazane (PPhS):

$PhSiH_3$ (10 g, 92 mmol) and $Ru_3(CO)_{12}$ (0.020 g, 0.034 mol %) were stirred in a stainless steel Parr reactor under $N_2$. Gaseous $NH_3$ (70 psi) was added and the mixture stirred at 90° C. with periodic venting of the gas evolved. Toluene (5 g) was added to the viscous mixture near the end of the reaction to promote stirring and NH$_3$ solubility. A total of ~1190 psi NH$_3$ was added, in 11 portions, and a total of ~1520 psi was evolved. Removal of the solvent under reduced pressure at 100° C. gave a pale yellow, waxy solid.

B. Coating Procedures

Two different coating procedures were used. The first procedure involved painting relatively thick coatings onto substrates using viscous coating solutions, while the second procedure involved dip-coating using coating solutions containing on the order of 5 wt. % to 10 wt. % polymer.

Panels of zinc-plated galvanized steel were used as the testing substrates for the first procedure in which thicker coatings were produced. The panel size was 1"×2"inch and approximately 0.5 mm thick. The specimens were ultrasonically cleaned in water, ethanol, and toluene and then heated in nitrogen at 300° C. for one hour.

Polymer solutions were prepared in toluene with concentrations varying as indicated in Table 1, and painted on the above-mentioned substrates to provide coatings having a thickness on the order of 50 μm. The coatings were allowed to dry and then heated rapidly to 100° C., 200° C. or 300° C. in varying curing environments as indicated in Table 1.

Heat treatment varied from specimen to specimen, as follows:

Category 1: Immediately after brush coating, specimens were placed on a plate that had been preheated at 300° C. for 5 minutes.

Category 2: Coat specimens first left at room temperature under N$_2$ for at least 2 hours for solvent removal, then placed on plate that had been preheated at 300° C. for 5 minutes.

Category 3: Coated specimens first left at room temperature under N$_2$ for at least 2 hours, then placed on cold plate that was rapidly heated to 300° C. (~9 minutes).

Category 4: As for Category 3 but with a 5 minute dwell period at 300° C.

Category 5: As for Category 2 except plate heated at 200° C.

Category 6: In air for 72 hours; no heat curing.

Category 7: As for Category 2 except specimens left at room temperature overnight for solvent removal.

Category 8: In air at room temperature >1 week.

Category 9: In air at room temperature overnight, then heated as for Category 5.

Bending Test: If samples bent completely (180°) without any coating rupture, the coating flexibility was ranked at 0T. If the coating fissured, the bending test was repeated with plates of the same thickness inserted between the bent wings until no rupture was observed. The flexibility scale was determined by the number of plates inserted when no rupture was observed (e.g., 1T, 2T, etc.).

Hardness Test: The hardness of the coatings was evaluated by ASTM D 3363-74 (the "Pencil Test").

Adhesion Test: In the tests summarized in Table 2, adhesion results were based on visual inspection according to ASTM D 3359-78 Method B (the "Scotch Tape Test"). Crack detection was performed with an optical microscope.

C. Coating Results

The performance observations on the polysilazane coatings during and after the curing process are reported in Table 2.

TABLE 1

| Example No. | Polymer (wt % in Soln) | Environment | Heat Treatment | Observations |
|---|---|---|---|---|
| 1 | PNMS(30%) | N$_2$ | 1 | Vigorous bubble formation due to solvent removal. |
| 2 | PNMS(30%) | N$_2$ | 2 | Much less bubbling due to solvent removal; low molecular weight oligomers plus the liquid phase of the polymer; cracks formed. |
| 3 | PNMS(30%) | N$_2$ | 3 | More cracks were formed before exposure to air than for #2. |
| 4 | PNMS(30%) | N$_2$ | 4 | More cracking than for #3. |
| 5 | PNMS(30%) | Air | 2 | Cracking during heating. |
| 6 | PNMS(30%) | Air | 3 | More cracking than for #5 during heating. |
| 7 | PNMS(30%) | Air | 4 | More cracking than for #6 during heating. |
| 8 | APNMS(50%) | N$_2$ | 2 | Only a few bubbles, but cracks formed after completion of process; coating adhered well. |
| 9 | APNMS(50%) | N$_2$ | 3 | No bubbles; no cracks; good adhesion. |
| 10 | APNMS(50%) | N$_2$ | 3 | No bubbles; minor cracks; good adhesion. |
| 11 | APNMS(50%) | Air | 3 | No bubbles; minor cracks; good adhesion. |
| 12 | APNMS(50%) | Air | 4 | No bubbles; minor cracks; good adhesion. |
| 13 | APNMS(50%) | Air | 5 | No cracks, but degrades after 72 hours. |
| 14 | PHPhS(25%) | N$_2$ | 3 | Good adhesion; no cracks. |
| 15 | PHPhS(25%) | N$_2$ | 4 | Good adhesion; no cracks. |
| 16 | PHPhS(25%) | N$_2$ | 5 | Good adhesion; no cracks. |
| 17 | PHPhS(25%) | N$_2$ | 2 | Good adhesion; only minimal cracking pattern. |
| 18 | PHPhS(25%) | Air | 3 | Good adhesion; no cracks. |
| 19 | PHPhS(25%) | Air | 4 | Good adhesion; no cracks. |
| 20 | PHPhS(25%) | Air | 5 | Good adhesion; no cracks. |
| 21 | APCMS(10%) | N$_2$ | 2 | Smooth surface; good adhesion; no cracks. |
| 22 | APCMS(10%) | N$_2$ | 3 | Smooth surface; good adhesion; no cracks. |
| 23 | APCMS(10%) | N$_2$ | 4 | Smooth surface; good adhesion; no cracks. |
| 24 | APCMS(10%) | N$_2$ | 5 | Smooth surface; good adhesion; no cracks. |
| 25 | APCMS(10%) | Air | 3 | Wrinkled surface; good adhesion; matte appearance; no cracks. |
| 26 | APCMS(10%) | Air | 4 | Wrinkled surface; good adhesion; matte appearance; no cracks. |
| 27 | APCMS(10%) | Air | 5 | Wrinkled surface; good adhesion; matte |

TABLE 1-continued

| Example No. | Polymer (wt % in Soln) | Environment | Heat Treatment | Observations |
|---|---|---|---|---|
| | | | | appearance; no cracks. |
| 28 | PCMS(25%) | $N_2$ | 5 | Smooth transparent coating. |
| 29 | PCMS(25%) | $N_2$ | 4 | Smooth transparent coating. |
| 30 | PCMS(25%) | $N_2$ | 2 | Smooth transparent coating. |
| 31 | PCMS(25%) | Air | 8 | Smooth transparent coating. |
| 32 | PCMS(25%) | Air | 4 | Smooth transparent coating. |
| 33 | PCMS(25%) | Air | 5 | Smooth transparent coating. |
| 34 | PCMS(25%) | Air | 2 | Smooth transparent coating. |

TABLE 2

| Example No. | Polymer (wt % in Soln) | Environment | Heat Treatment | Observations | | |
|---|---|---|---|---|---|---|
| 14 | PHPhS | $N_2$ | 3 | >6H | 5B | 2T |
| 16 | PHPhS | $N_2$ | 5 | >6H | 5B | 5T |
| 17 | PHPhS | $N_2$ | 2 | 5H | 5B | 5T |
| 18 | PHPhS | Air | 3 | >6H | 5B | 5T |
| 20 | PHPhS | Air | 5 | >6H | 5B | 5T |
| 21 | APCMS | $N_2$ | 2 | >6H | 5B | 3T |
| 22 | APCMS | $N_2$ | 3 | >6H | 5B | 3T |
| 23 | APCMS | $N_2$ | 4 | >6H | 5B | 3T |
| 25 | APCMS | Air | 3 | >6H | 2B | >5T |
| 26 | APCMS | Air | 4 | >6H | 2B | >5T |
| 27 | APCMS | Air | 5 | >6H | 2B | >5T |
| 28 | PCMS | $N_2$ | 5 | >6H | 5B | 2T |
| 29 | PCMS | $N_2$ | 4 | >6H | 5B | 2T |
| 30 | PCMS | $N_2$ | 2 | >6H | 5B | 2T |
| 31 | PCMS | $N_2$ | 8 | >6H | 5B | 2T |
| 32 | PCMS | $N_2$ | 4 | >6H | 5B | 2T |
| 33 | PCMS | $N_2$ | 5 | >6H | 5B | 2T |
| 34 | PCMS | $N_2$ | 2 | >6H | 5B | 2T |

Coating results may be summarized as follows:

PCMS and APCMS: When the silicon atoms are substituted with one methyl group, as in PCMS and APCMS, the fabricated coatings were superior to those obtained with the N-methylated polymers. PCMS provided uniform, transparent coatings under both nitrogen and air. APCMS gave glossy uncracked coatings formed under nitrogen. In air, the APCMS coatings were also uncracked.

PNMS and APNMS: PNMS and APNMS seem to be unsuitable polymers for the thick coatings prepared in this experiment, but are promising candidates for preparation of thinner coatings (see Example 35).

PHPhS: The polymer PHPhS provided uniform coatings in both nitrogen and air. Cracks were observed only when coated specimens were put on a plate already heated at 300° C. Even then, the cracking pattern was minimal and the cracks were ~1 μm wide, barely detectable by optical microscopy.

EXAMPLE 35

Poly(Methylsiloxanes)

(a) [CH$_3$SiHO]$_4$: To 6.0 g (100 mmol) [CH$_3$SiHO]$_4$ (Hulse America) were added 0.40 g water and Ru$_3$(CO)$_{12}$ as above. The reaction was carried out at 60° C. under nitrogen and detected by the observed hydrogen pressure formed in the reactor. After ½ hour, a total pressure of 440 psi was found. After 2 hour, a total pressure of 520 psi was observed. No more gas evolution was observed. Pyrolysis was carried out at a rate of 5° C./min up to 900° C. Pyrolysis under nitrogen gave a 70% yield, while pyrolysis under ammonia gave a 77.3% yield. Elemental analysis of the product before pyrolysis gave the following: C, 19.91 (mol ratio 1.03); H, 5.67 (mol ratio 3.81); N, 0.10; Si, 41.63 (mol ratio 1.00); O, 22.16 (mol ratio 0.93). Elemental analysis of the product after pyrolysis under nitrogen gave: C, 12.66 (mol ratio 0.65); H 0.98 (mol ratio 0.60); N, 0.74 (mol ratio 0.03); Si, 45.74 (mol ratio 1.00); O, 40.27 (mol ratio 1.54). The mole ratio of SiO$_2$:SiC:C was derived.

(b) [CH$_3$SiHO]$_{29}$: To 6.0 g (100 mmol) [CH$_3$SiHO]$_{29}$ were added 0.18 g water and Ru$_3$(CO)$_{12}$ as above. The reaction was carried out at 60° C. under nitrogen and, as in Section (a), detected by the observed pressure formed in the reactor. After ½ hour, a total pressure of 150 psi was formed. After 2 hour, a total pressure of 180 psi was observed. No more gas evolution was observed. Elemental analysis of the product before pyrolysis gave the following: C, 20.69 (mol ratio 1.13); H, 6.70 (mol ratio 4.41); N, 0.24; Si, 42.78 (mol ratio 1.00); O, 26.81 (mol ratio 1.07). Elemental analysis of the product after pyrolysis under nitrogen gave: C, 12.73 (mol ratio 1.06); H, 0.82 (mol ratio 0.82); N, 0.80 (mol ratio 0.06); Si, 45.53 (mol ratio 1.63); O, 40.41 (mol ratio 2.52).

(c) To 10 grams of cyclotetrahydridomethylsiloxane [CH$_3$SiHO]$_4$, in 20 g tetrahydrofuran (THF) were added 0.67 g H$_2$O and 20 mg Ru$_3$(CO)$_{12}$, and the solution was heated to 60° C. under nitrogen. The reaction was followed by observing the total pressure in the reactor. After 15 minutes, the total pressure observed was 280 psi; after 3 hours, the increase in pressure stopped and the evolution of gas (H$_2$, as above) was thus completed. After removal of solvent, a viscous, waxy polymer, polycyclohydridomethylsiloxane (PHMSO) was obtained, removed from the reactor, and diluted to give a 5 wt. % solution. The polymer slowly continued to crosslink and converted to a solid product which was still soluble in THF.

These various polymers can be used to prepare thermally stable and/or nonwetting coatings by curing on a substrate in a selected curing atmosphere.

EXAMPLES 36–44

A solution of 5% PNMS in THF was prepared as the dipping solution. Stainless steel plates (304SS) having smooth but not highly polished surfaces, and dimensions of 1"×4", were ultrasonically cleaned The plates were dipped in the polymer solution dried in air to provide coatings on the order of 1 μm in thickness. Then they were cured under different conditions, as indicated in Table 3, for 24 hours. (Where a "wet" environment is indicated in the table, the curing atmosphere was produced by bubbling the selected gas into the heating chamber through a water reservoir.) The following table summarizes the results:

TABLE 3

| Ex. No. | Gaseous Conditions | Maximum Temperature | Observations |
|---|---|---|---|
| 36 | air (24 hr) | room temp. | Repellency of water and organics. |
| 37 | air (dry) | 300° C. | Repellency of water and |

TABLE 3-continued

| Ex. No. | Gaseous Conditions | Maximum Temperature | Observations |
|---|---|---|---|
| | | | organics; uncoated areas turned golden. |
| 38 | air (dry) | 400° C. | Repellency of water and organics; uncoated areas turned golden; slight golden color under coatings. |
| 39 | air (wet*) | 400° C. | Repellency of water and organics; uncoated areas turn golden. |
| 40 | air (dry) | 500° C. | Coatings do not repel water and organics. |
| 41 | N₂ (wet) | 300° C. | Repellency of water and organics; no golden color under coatings. |
| 42 | N₂ (wet) | 400° C. | Repellency of water and organics; no golden color under coatings. |
| 43 | N₂ (wet) | 500° C. | Repellency of water only but wetting of organics; no golden color under coatings. |
| 44 | N₂ (wet) | 600° C. | No repellency of water and organics; no golden color under coatings. |

It may be concluded from the results summarized in Table 3 that PNMS is useful for preparing thin coatings using a variety of preparation conditions. A water-repellent coating may be provided, so long as curing is carried out in an oxidative atmosphere at a temperature which is not excessive. It should also be noted that where the cured coatings did exhibit water repellency, they exhibited repellency to organic liquids as well, including toluene, acetone, ethanol, trichloroethane, and mineral oil.

EXAMPLES 45-46

A solution of 5% PNMS in THF was prepared as the dipping solution. Glass slides having the dimensions 1 cm×5 cm were ultrasonically cleaned. The slides were dipped in the polymer solution, dried in air for 24 hours, and cured. A first slide coated using the aforementioned procedure was cured at room temperature, while a second coated slide was cured at 400° C. Both coated slides were found to repel water and the organic liquids toluene, acetone, ethanol, trichloroethane and mineral oil.

Examples 47-50

A solution of 10% PCMS in THF was prepared as the dipping solution. Stainless steel plates (304SS) having smooth but not highly polished surfaces, and dimensions of 1"×4", were ultrasonically cleaned. The plates were dipped in the polymer solution, dried in air, and cured as indicated in Table 4.

TABLE 4

| Ex. No. | Gaseous Conditions | Maximum Temperature | Observations |
|---|---|---|---|
| 47 | air (24 hr) | room temp. | Repellency of water and organics; soft coating. |
| 48 | air (dry) | 150° C. | Repellency of water and organics. |
| 49 | air (dry) | 300° C. | Repellency of water and organics; uncoated areas turn golden. |
| 50 | N₂ (wet) | 300° C. | Repellency of water and organics. |

Thus, PCMS may also be used to prepare water- and organic liquid-repellent coatings.

EXAMPLES 51-52

A dipping solution of 10% polyhydridosiloxane, containing 2 mg of $Ru_3(CO)_{12}$ as a crosslinking catalyst, was prepared in toluene. Steel plates (304SS), dimensions 1"×4", were ultrasonically cleaned. The plates were dipped in the polymer solution and dried in air. A first coated plate was cured in air for 24 hours at room temperature, while a second coated plate was cured for 24 hours at 150° C. Both coatings exhibited repellency to water and organic liquids, as did the coatings in the preceding examples.

EXAMPLES 53-54

A homogeneous mixture of polyhydridosiloxane (MW=4000) containing $Ru_3(CO)_{12}$ as a crosslinking catalyst (10 ng per 20 g polymer) was prepared as a low viscosity oil designed to be applied to surfaces by brushing. Steel plates (304SS), dimensions 1"×4", were ultrasonically cleaned. The polymer/catalyst mixture was brushed onto the plate surface and aged in air for 24 hours. Though the coated liquid was cured, the coatings (0.20-50 μm thick) were soft. However, the coatings demonstrated repellency with respect to both water and organic liquids.

We claim:

1. A method for providing a thermally stable, non-pyrolyzed coating on a substrate, comprising:

(a) providing a solution of a curable silicon-containing polymer comprising units having the structural formula (I)

in which

R¹ and R² are independently selected from the group consisting of (i) hydrogen, (ii) hydroxyl, (iii) $C_1$-$C_{10}$ alkyl, either unsubstituted or substituted with hydroxyl, lower alkyl, lower alkenyl, lower alkoxy, halogen, silyl or $NR^3_2$ groups wherein $R^3$ is hydrogen, lower alkyl or lower alkenyl, (iv) $C_1$-$C_{10}$ alkenyl, either unsubstituted or substituted as in (iii), (v) $C_1$-$C_{10}$ alkoxy, either unsubstituted or substituted as in (iii), (vi) aryl of 1-2 rings, either unsubstituted or substituted as in (iii), (vii) $NR^3_2$ and (viii) silyl, or one or both of R¹ and R² may be an —O—, —$NR^{3a}$— or alkylene crosslink to another unit of structural formula (I), wherein $R^{3a}$ is hydrogen, lower alkyl, lower alkenyl or aryl of 1-2 rings, either unsubstituted or substituted as in (iii),

X¹ and X² are independently either O or $NR^4$ where $R^4$ is selected from the group consisting of hydrogen, amino, silyl, unsubstituted $C_1$-$C_8$ hydrocarbyl, $C_1$-$C_8$ hydrocarbyl substituted as in (iii), and aryl of 1-2 rings, either unsubstituted or substituted as in (iii), with the proviso that at least one of X¹ and X² is $NR^4$, x is an integer greater than or equal to 0, and y is an integer greater than or equal to 1, with the proviso that the sum of x and y is at least 2, and n is 0, 1 or 2;

(b) coating a substrate with the solution; and
(c) curing the coating on the substrate in the presence of a catalyst effective to activate a bond selected from the group consisting of Si—H, N—H and O—H, at a temperature which is sufficiently low to avoid pyrolysis of the coating.

2. A method for providing a thermally stable, non-pyrolyzed coating on a substrate, comprising:
(a) providing a solution of a curable polysilazane containing recurring units of the structures (V) or (VI) or both in which
k is 0 or an integer;
the $R^5$ substituents may be the same or different and are selected from the group consisting of hydrogen, hydroxyl, lower alkyl, lower alkenyl, lower alkoxy, silyl, aryl, and amino, unsubstituted or substituted with 1 or 2 lower alkyl groups,
X is —$NR^7$— or —$NR^7$—Y—$NR^7$— where Y is an optional linking group which, if present, is lower alkyl, lower alkenyl or silyl, and
the $R^6$ and $R^7$ may be the same or different and are independently selected from the group consisting of hydrogen, lower alkyl, lower alkenyl, silyl and aryl;
(b) coating a substrate with the solution; and
(c) curing the coating on the substrate in the presence of a catalyst effective to activate a bond selected from the group consisting of Si—H, N—H and O—H, at a temperature of less than about 300° C.

3. The method of claim 1, wherein the solution comprises a compatible organic liquid containing approximately 0.1 wt. % to 99 wt. % polymer.

4. The method of claim 3, wherein the solution comprises a compatible organic liquid containing approximately 1 wt. % to 20 wt. % polymer.

5. The method of claim 2, wherein the solution comprises a compatible organic liquid containing approximately 0.1 wt. % to 99 wt. % polymer.

6. The method of claim 5, wherein the solution comprises a compatible organic liquid containing approximately 1 wt. % to 20 wt. % polymer.

7. The method of claim 1, wherein the substrate is metallic.

8. The method of claim 2, wherein the substrate is metallic.

9. The method of claim 1, wherein the substrate is glass.

10. The method of claim 2, wherein the substrate is glass.

11. The method of claim 1, wherein the substrate is ceramic.

12. The method of claim 2, wherein the substrate is ceramic.

13. The method of claim 1, wherein the substrate is organic.

14. The method of claim 2, wherein the substrate is organic.

15. The method of claim 1, wherein step (b) is repeated to provide multiple coatings.

16. The method of claim 2, wherein step (b) is repeated to provide multiple coatings.

17. The method of claim 1, wherein curing is effected at room temperature.

18. The method of claim 2, wherein curing is effected at room temperature.

19. The method of claim 1, wherein curing is effected at a temperature of at least about 50° C.

20. The method of claim 2, wherein curing is effected at a temperature of at least about 50° C.

21. The method of claim 1, wherein curing is effected in an inert atmosphere.

22. The method of claim 1, wherein curing is effected in a reactive atmosphere.

23. The method of claim 1, wherein curing is effected in the presence of an oxygen donor.

24. The method of claim 2, wherein curing is effected in the presence of an oxygen donor.

25. The method of claim 1, wherein curing is effected in the presence of a nitrogen donor.

26. The method of claim 2, wherein curing is effected in the presence of a nitrogen donor.

27. A method for rendering the surface of a substrate resistant to elevated temperatures, comprising:
(a) coating the surface with a solution of a curable silicon-containing polymer, wherein the silicon-containing polymer comprises units having the structural formula (I)

in which
$R^1$ and $R^2$ are independently selected from the group consisting of (i) hydrogen, (ii) hydroxyl, (iii) $C_1$-$C_{10}$ alkyl, either unsubstituted or substituted with hydroxyl, lower alkyl, lower alkenyl, lower alkoxy, halogen, silyl or $NR^3_2$ groups wherein $R^3$ is hydrogen, lower alkyl, or lower alkenyl, (iv) $C_1$-$C_{10}$ alkenyl, either unsubstituted or substituted as in (iii), (v) $C_1$-$C_{10}$ alkoxy, either unsubstituted or substituted as in (iii), (vi) aryl of 1–2 rings, either unsubstituted or substituted as in (iii), (vii) $NR^3_2$ and (viii) silyl, or one or both of $R^1$ and $R^2$ may be an —O—, —$NR^{3a}$— or alkylene crosslink to another unit of structural formula (I), wherein $R^{3a}$ is hydrogen, lower alkyl, lower alkenyl or aryl of 1–2 rings, either unsubstituted or substituted as in (iii),
$X^1$ and $X^2$ are independently either O or $NR^4$ where $R^4$ is selected from the group consisting of hydrogen, amino, silyl, unsubstituted $C_1$-$C_8$ hydrocarbyl, $C_1$-$C_8$ hydrocarbyl substituted as in (iii), and aryl of 1–2 rings, either unsubstituted or substituted as in (iii), with the proviso that at least one of $X^1$ and $X^2$ is $NR^4$, x is an integer greater than or equal to 0, and y is an integer greater than or equal to 1, with the proviso that the sum of x and y is at least 2, and n is 0, 1 or 2; and (b) curing the coating on the substrate in the presence of a catalyst effective to activate a bond selected from the group consisting of Si—H, N—H and O—H.

28. A method for rendering the surface of a substrate resistant to elevated temperatures, comprising:

(a) coating the surface with a solution of a curable polysilazane containing recurring units of the structures (V) or (VI) or both (V)

(VI)

in which k is 0 or an integer;

the $R^5$ substituents may be the same or different and are selected from the group consisting of hydrogen, hydroxyl, lower alkyl, lower alkenyl, lower alkoxy, silyl, aryl, and amino, unsubstituted or substituted with 1 or 2 lower alkyl groups,

X is —$NR^7$— or —$NR^7$—Y—$NR^7$— where Y is an optional linking group which, if present, is lower alkyl, lower alkenyl or silyl, and the $R^6$ and $R^7$ may be the same or different and are independently selected from the group consisting of hydrogen, lower alkyl, lower alkenyl, silyl and aryl; and (b) curing the coating on the substrate in the presence of a catalyst effective to activate a bond selected from the group consisting of Si—H, N—H and O—H, at a temperature of less than about 300° C.

29. A method for rendering the surface of a substrate corrosion-resistant, comprising:

(a) coating the surface with a solution of a curable silicon-containing polymer, wherein the silicon-containing polymer comprises units having the structural formula (I)

(I)

in which $R^1$ and $R^2$ are independently selected from the group consisting of (i) hydrogen, (ii) hydroxyl, (iii) $C_1$-$C_{10}$ alkyl, either unsubstituted or substituted with hydroxyl, lower alkyl, lower alkenyl, lower alkoxy, halogen, silyl or $NR^3{}_2$ groups, wherein $R^3$ is hydrogen, lower alkyl, or lower alkenyl, (iv) $C_1$-$C_{10}$ alkenyl, either unsubstituted or substituted as in (iii), (v) $C_1$-$C_{10}$ alkoxy, either unsubstituted or substituted as in (iii), (vi) aryl of 1–2 rings, either unsubstituted or substituted as in (iii), (vii) $NR^3{}_2$ and (viii) silyl, or one or both of $R^1$ and $R^2$ may be an —O—, —$NR^{3a}$— or alkylene crosslink to another unit of structural formula (I), wherein $R^{3a}$ is hydrogen, lower alkyl, lower alkenyl or aryl of 1–2 rings, either unsubstituted or substituted as in (iii), $X^1$ and $X^2$ are independently either O or $NR^4$ where $R^4$ is selected from the group consisting of hydrogen, amino, silyl, unsubstituted $C_1$-$C_8$ hydrocarbyl, $C_1$-$C_8$ hydrocarbyl substituted as in (iii), and aryl of 1–2 rings, either unsubstituted or substituted as in (iii), with the proviso that at least one of $X^1$ and $X^2$ is $NR^4$, x is an integer greater than or equal to 0, and y is an integer greater than or equal to 1, with the proviso that the sum of x and y is at least 2, and n is 0, 1 or 2; and (b) curing the coating on the substrate in the presence of a catalyst effective to activate a bond selected from the group consisting of Si—H, N—H and O—H.

30. A method for rendering the surface of a substrate corrosion-resistant, comprising:

(a) coating the surface with a solution of a curable polysilazane containing recurring units of the structures (V) or (VI) or both (V)

(VI)

in which k is 0 or an integer;

the $R^5$ substituents may be the same or different and are selected from the group consisting of hydrogen, hydroxyl, lower alkyl, lower alkenyl, lower alkoxy, silyl, aryl, and amino, unsubstituted or substituted with 1 or 2 lower alkyl groups,

X is —$NR^7$— or —$NR^7$—Y—$NR^7$— where Y is an optional linking group which, if present, is lower alkyl, lower alkenyl or silyl, and the $R^6$ and $R^7$ may be the same or different and are independently selected from the group consisting of hydrogen, lower alkyl, lower alkenyl, silyl and aryl; and (b) curing the coating on the substrate in the presence of a catalyst effective to activate a bond selected from the group consisting of Si—H, N—H and O—H, at a temperature of less than about 300° C.

31. A method for rendering the surface of a substrate nonwetting, comprising:

(a) coating the surface with a solution of a curable silicon-containing polymer, wherein the silicon-containing polymer comprises units having the structural formula (I)

in which

R$^1$ and R$^2$ are independently selected from the group consisting of (i) hydrogen, (ii) hydroxyl, (iii) C$_1$-C$_{10}$ alkyl, either unsubstituted or substituted with hydroxyl, lower alkyl, lower alkenyl, lower alkoxy, halogen, silyl or NR$^3{}_2$ groups wherein R$^3$ is hydrogen, lower alkyl, or lower alkenyl, (iv) C$_1$-C$_{10}$ alkenyl, either unsubstituted or substituted as in (iii), (v) C$_1$-C$_{10}$ alkoxy, either unsubstituted or substituted as in (iii), (vi) aryl of 1-2 rings, either unsubstituted or substituted as in (iii), (vii) NR$^3{}_2$ and (viii) silyl, or one or both of R$^1$ and R$^2$ may be an —O—, —NR$^{3a}$— or alkylene crosslink to another unit of structural formula (I), wherein R$^{3a}$ is hydrogen, lower alkyl, lower alkenyl or aryl of 1-2 rings, either unsubstituted or substituted as in (iii), X$^1$ and X$^2$ are independently either O or NR$^4$ where R$^4$ is selected from the group consisting of hydrogen, amino, silyl, unsubstituted C$_1$-C$_8$ hydrocarbyl, C$_1$-C$_8$ hydrocarbyl substituted as in (iii), and aryl of 1-2 rings, either unsubstituted or substituted as in (iii), with the proviso that at least one of X$^1$ and X$^2$ is NR$^4$, x is an integer greater than or equal to 0, and y is an integer greater than or equal to 1, with the proviso that the sum of x and y is at least 2, and n is 0, 1 or 2; and

(b) curing the coating on the substrate at a temperature which does not exceed approximately 450° C. in a curing atmosphere containing an oxygen donor, in the presence of a catalyst effective to activate a bond selected from the group consisting of Si—H, N—H and O—H.

32. The method of claim 31, wherein the oxygen donor is water vapor.

33. A method for rendering the surface of a substrate nonwetting, comprising:

(a) coating the surface with a solution of a curable polysilazane containing recurring units of the structures (V) or (VI) or both in which k is 0 or an integer;

the R$^5$ substituents may be the same or different and are selected from the group consisting of hydrogen, hydroxyl, lower alkyl, lower alkenyl, lower alkoxy, silyl, aryl, and amino, unsubstituted or substituted with 1 or 2 lower alkyl groups, X is —NR$^7$— or —NR$^7$—Y—NR$^7$— where Y is an optional linking group which, if present, is lower alkyl, lower alkenyl or silyl, and the R$^6$ and R$^7$ may be the same or different and are independently selected from the group consisting of hydrogen, lower alkyl, lower alkenyl, silyl and aryl; and (b) curing the coating on the substrate in a curing atmosphere containing an oxygen donor.

34. The method of claim 33, wherein the oxygen donor is water vapor.

35. A method for providing a thermally stable, non-pyrolyzed coating on a substrate, comprising:

(a) providing a solution of a curable silicon-containing polymer comprising units having the structural formula (I)

in which

R$^1$ and R$^2$ are independently selected from the group consisting of (i) hydrogen, (ii) hydroxyl, (iii) C$_1$-C$_{10}$ alkyl, either unsubstituted or substituted with hydroxyl, lower alkyl, lower alkenyl, lower alkoxy, halogen, silyl or NR$^3{}_2$ groups wherein R$^3$ is hydrogen, lower alkyl, or lower alkenyl, (iv) C$_1$-C$_{10}$ alkenyl, either unsubstituted or substituted as in (iii), (v) C$_1$-C$_{10}$ alkoxy, either unsubstituted or substituted as in (iii), (vi) aryl of 1-2 rings, either unsubstituted or substituted as in (iii), (vii) NR$^3{}_2$ and (viii) silyl, or one or both of R$^1$ and R$^2$ may be an —O—, —NR$^{3a}$— or alkylene crosslink to another unit of structural formula (I), wherein R$^{3a}$ is hydrogen, lower alkyl, lower alkenyl or aryl of 1-2 rings, either unsubstituted or substituted as in (iii), X$^1$ and X$^2$ are both oxygen atoms, x is an integer greater than or equal to 0, and y is an integer greater than or equal to 1, with the proviso that the sum of x and y is at least 2, and n is 0 or 1;

(b) incorporating an organic or inorganic powder into the coating solution;

(c) coating a substrate with the solution; and

(d) curing the coating on the substrate in the presence of a catalyst effective to activate a bond selected from the group consisting of Si—H, N—H and O—H.

36. A method for rendering the surface of a substrate resistant to elevated temperatures, comprising:
(a) coating the surface with a solution of a curable silicon-containing polymer and an organic or inorganic powder, wherein the silicon-containing polymer comprises units having the structural formula (I)

in which
R$^1$ and R$^2$ are independently selected from the group consisting of (i) hydrogen, (ii) hydroxyl, (iii) C$_1$–C$_{10}$ alkyl, either unsubstituted or substituted with hydroxyl, lower alkyl, lower alkenyl, lower alkoxy, halogen, silyl or NR$^3{}_2$ groups wherein R$^3$ is hydrogen, lower alkyl, or lower alkenyl, (iv) C$_1$–$_{C10}$ alkenyl, either unsubstituted or substituted as in (iii), (v) C$_1$–C$_{10}$ alkoxy, either unsubstituted or substituted as in (iii), (vi) aryl of 1–2 rings, either unsubstituted or substituted as in (iii), (vii) NR$^3{}_2$ and (viii) silyl or one or both of R$^1$ and R$^2$ may be an —O—, —NR$^{3a}$— or alkylene crosslink to another unit of structural formula (I), wherein R$^{3a}$ is hydrogen, lower alkyl, lower alkenyl or aryl of 1–2 rings, either unsubstituted or substituted as in (iii), X$^1$ and X$^2$ are both oxygen atoms,
x is an integer greater than or equal to 0, and y is an integer greater than or equal to 1, with the proviso that the sum of x and y is at least 2, and
n is 0 or 1; and
(b) curing the coating on the substrate in the presence of a catalyst effective to activate a bond selected from the group consisting of Si—H, N—H and O—H.

37. A method for rendering the surface of a substrate corrosion-resistant, comprising:
(a) coating the surface with a solution of a curable silicon-containing polymer and an organic or inorganic powder, wherein the silicon-containing polymer comprises units having the structural formula (I)

in which
R$^1$ and R$^2$ are independently selected from the group consisting of (i) hydrogen, (ii) hydroxyl, (iii) C$_1$–C$_{10}$ alkyl, either unsubstituted or substituted with hydroxyl, lower alkyl, lower alkenyl, lower alkoxy, halogen, silyl or NR$^3{}_2$ groups wherein R$^3$ is hydrogen, lower alkyl, or lower alkenyl, (iv) C$_1$–C$_{10}$ alkenyl, either unsubstituted or substituted as in (iii), (v) C$_1$–C$_{10}$ alkoxy, either unsubstituted or substituted as in (iii), (vi) aryl of 1–2 rings, either unsubstituted or substituted as in (iii), (vii) NR$^3{}_2$ and (viii) silyl or one or both of R$^1$ and R$^2$ may be an —O—, —NR$^{3a}$— or alkylene crosslink to another unit of structural formula (I), wherein R$^{3a}$ is hydrogen, lower alkyl, lower alkenyl or aryl of 1–2 rings, either unsubstituted or substituted as in (iii), X$^1$ and X$^2$ are both oxygen atoms,
x is an integer greater than or equal to 0, and y is an integer greater than or equal to 1, with the proviso that the sum of x and y is at least 2, and
n is 0 or 1; and
(b) curing the coating on the substrate in the presence of a catalyst effective to activate a bond selected from the group consisting of Si—H, N—H and —O—H.

38. A method for rendering the surface of a substrate nonwetting, comprising:
(a) coating the surface with a solution of a curable silicon-containing polymer and an organic or inorganic powder, wherein the silicon-containing polymer comprises units having the structural formula (I)

in which
R$^1$ and R$^2$ are independently selected from the group consisting of (i) hydrogen, (ii) hydroxyl, (iii) C$_1$–C$_{10}$ alkyl, either unsubstituted or substituted with hydroxyl, lower alkyl, lower alkenyl, lower alkoxy, halogen, silyl or NR$^3{}_2$ groups, wherein R$^3$ is hydrogen, lower alkyl, or lower alkenyl, (iv) C$_1$–C$_{10}$ alkenyl, either unsubstituted or substituted as in (iii), (v) C$_1$–C$_{10}$ alkoxy, either unsubstituted or substituted as in (iii), (vi) aryl of 1–2 rings, either unsubstituted or substituted as in (iii), (vii) NR$^3{}_2$ and (viii) silyl, or one or both of R$^1$ and R$^2$ may be an —O—, —NR$^{3a}$— or alkylene crosslink to another unit of structural formula (I), wherein R$^{3a}$ is hydrogen, lower alkyl, lower alkenyl or aryl of 1–2 rings, either unsubstituted or substituted as in (iii),
X$^1$ and X$^2$ are both oxygen atoms,
x is an integer greater than or equal to 0, and y is an integer greater than or equal to 1, with the provisos that the sum of x and y is at least 2, and
n is 0 or 1; and
(b) curing the coating on the substrate at a temperature which does not exceed approximately 450° C. in a curing atmosphere containing an oxygen donor, and in the presence of a catalyst effective to activate a bond selected from the group consisting of Si—H, N—H and O—H.

39. The method of claim 38, wherein the oxygen donor is water vapor.

40. The method of claim 38, wherein the powder is comprised of a ceramic material.

41. The method of claim 36, wherein the powder is comprised of a ceramic material.

42. The method of claim 37, wherein the powder is comprised of a ceramic material.

43. The method of claim 38, wherein the powder is comprised of a ceramic material.

44. A method for providing a thermally stable, non-pyrolyzed coating on a substrate, comprising:

(a) providing a solution of a curable silicon-containing polymer comprising units having the structural formula (I)

(I)

in which

R$^1$ and R$^2$ are independently selected from the group consisting of (i) hydrogen, (ii) hydroxyl, (iii) C$_1$–C$_{10}$ alkyl, either unsubstituted or substituted with hydroxyl, lower alkyl, lower alkenyl, lower alkoxy, halogen, silyl or NR$^3{}_2$ groups wherein R$^3$ is hydrogen, lower alkyl, or lower alkenyl, (iv) C$_1$–C$_{10}$ alkenyl, either unsubstituted or substituted as in (iii), (v) C$_1$–C$_{10}$ alkoxy, either unsubstituted or substituted as in (iii), (vi) aryl of 1–2 rings, either unsubstituted or substituted as in (iii), (vii) NR$^3{}_2$ and (viii) silyl or one or both of R$^1$ and R$^2$ may be an —O—, —NR$^{3a}$— or alkylene crosslink to another unit of structural formula (I), wherein R$^{3a}$ is hydrogen, lower alkyl, lower alkenyl or aryl of 1–2 rings, either unsubstituted or substituted as in (iii),

X$^1$ and X$^2$ are independently either O or NR$^4$ where R$^4$ is selected from the group consisting of hydrogen, amino, silyl, unsubstituted C$_1$–C$_8$ hydrocarbyl, C$_1$–C$_8$ hydrocarbyl substituted as in (iii), and aryl of 1–2 rings, either unsubstituted or substituted as in (iii), x is an integer greater than or equal to 0, and y is an integer greater than or equal to 1, with the proviso that the sum of x and y is at least 2, and n is 0, 1 or 2, with the proviso that if both X$^1$ and X$^2$ are O, n is other than 2;

(b) coating a substrate with the solution; and
(c) curing the coating on the substrate in an inert atmosphere.

45. A method for providing a thermally stable, non-pyrolyzed coating on a substrate, comprising:
(a) providing a solution of a curable silicon-containing polymer comprising units having the structural formula (I)

(I)

in which

R$^1$ and R$^2$ are independently selected from the group consisting of (i) hydrogen, (ii) hydroxyl, (iii) C$_1$–C$_{10}$ alkyl, either unsubstituted or substituted with hydroxyl, lower alkyl, lower alkenyl, lower alkoxy, halogen, silyl or NR$^3$ groups wherein R$^3$ is hydrogen lower alkyl, or lower alkenyl, (iv) C$_1$–C$_{10}$ alkenyl, either unsubstituted or substituted as in (iii), (v) C$_1$–C$_{10}$ alkoxy, either unsubstituted or substituted as in (iii), (vi) aryl of 1–2 rings, either unsubstituted or substituted as in (iii), (vii) NR$^3{}_2$ and (viii) silyl, or one or both of R$^1$ and R$^2$ may be an —O—, —NR$^{3a}$— or alkylene crosslink to another unit of structural formula (I), wherein R$^{3a}$ is hydrogen, lower alkyl, lower alkenyl or aryl of 1–2 rings, either unsubstituted or substituted as in (iii),

X$^1$ and X$^2$ are independently either O or NR$^4$ where R$^4$ is selected from the group consisting of hydrogen, amino, silyl, unsubstituted C$_1$–C$_8$ hydrocarbyl, C$_1$–C$_8$ hydrocarbyl substituted as in (iii), and aryl of 1–2 rings, either unsubstituted or substituted as in (iii), x is an integer greater than or equal to 0, and y is an integer greater than or equal to 1, with the proviso that the sum of x and y is at least 2, and n is 0, 1 or 2, with the proviso that if both X$^1$ and X$^2$ are O, n is other than 2;

(b) coating a substrate with the solution; and
(c) curing the coating on the substrate in the presence of a nitrogen donor.

46. A method for rendering the surface of a substrate nonwetting, comprising:
(a) coating the surface with a solution of a curable silicon-containing polymer, wherein the silicon-containing polymer comprises units having the structural formula (I)

(I)

in which

R$^1$ and R$^2$ are independently selected from the group consisting of (i) hydrogen, (ii) hydroxyl, (iii) C$_1$–C$_{10}$ alkyl, either unsubstituted or substituted with hydroxyl, lower alkyl, lower alkenyl, lower alkoxy, halogen, silyl or NR$^3{}_2$ groups, wherein R$^3$ is hydrogen, lower alkyl, or lower alkenyl, (iv) C$_1$–C$_{10}$ alkenyl, either unsubstituted or substituted as in (iii), (v) C$_1$–C$_{10}$ alkoxy, either unsubstituted or substituted as in (iii), (vi) aryl of 1–2 rings, either unsubstituted or substituted as in (iii), (vii) NR$^3{}_2$ and (viii) silyl or one or both of R$^1$ and R$^2$ may be an —O—, —NR$^{3a}$— or alkylene crosslink to another unit of structural formula (I), wherein R$^{3a}$ is hydrogen, lower alkyl, lower alkenyl or aryl of 1–2 rings, either unsubstituted or substituted as in (iii),

X$^1$ and X$^2$ are independently either O or NR$^4$ where R$^4$ is selected from the group consisting of hydrogen, amino, silyl, unsubstituted C$_1$–C$_8$ hydrocarbyl, C$_1$–C$_8$ hydrocarbyl substituted as in (iii), and aryl of 1–2 rings, either unsubstituted or substituted as in (iii), x is an integer greater than or equal to 0, and y is an integer greater than or equal to 1, with the proviso that the sum of x and y is at least 2, and n is 0, 1 or 2, with the proviso that if both X$^1$ and X$^2$ are O, n is other than 2; and (b) curing the coating on the substrate at a temperature which does not exceed approximately 450° C. in a curing atmosphere containing water vapor.

47. A method for providing a thermally stable, non-pyrolyzed coating on a substrate, comprising:
(a) providing a solution of a siloxane having the structural formula wherein the $R^5$ substituents may be the same or different and are selected from the group consisting of hydrogen, hydroxyl, lower alkyl, lower alkenyl, lower alkoxy, silyl, aryl, and amino, unsubstituted or substituted with 1 or 2 lower alkyl groups;

(b) incorporating a species H—X'—H into the solution, where X' is oxygen, $NR^7$ or $NR^7$—Y—$NR^7$ in the $R^7$ substituents may be the same or different and are selected from the group consisting of hydrogen, lower alkyl, lower alkenyl, silyl and aryl, and Y is an optional linking group which, if present, is lower alkyl, lower alkenyl or silyl;

(c) coating a substrate with the solution; and
(d) curing the coating on the substrate.

* * * * *